United States Patent
Gao et al.

(10) Patent No.: US 9,800,723 B2
(45) Date of Patent: Oct. 24, 2017

(54) METHOD, SYSTEM AND RELEVANT APPARATUSES FOR SELECTING MULTIMEDIA RING BACK TONE

(75) Inventors: Wenmei Gao, Shenzhen (CN); Guoqiao Chen, Shenzhen (CN); Jian Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 588 days.

(21) Appl. No.: 13/004,423

(22) Filed: Jan. 11, 2011

(65) Prior Publication Data

US 2011/0103570 A1 May 5, 2011

Related U.S. Application Data

(63) Continuation of application No. PCT/CN2009/072626, filed on Jul. 3, 2009.

(30) Foreign Application Priority Data

Jul. 11, 2008 (CN) .......................... 2008 1 0132469

(51) Int. Cl.
*H04M 3/00* (2006.01)
*H04M 3/42* (2006.01)
(Continued)

(52) U.S. Cl.
CPC ... *H04M 3/42017* (2013.01); *H04M 3/42068* (2013.01); *H04M 1/56* (2013.01);
(Continued)

(58) Field of Classification Search
CPC ........... H04L 29/06027; H04L 65/1069; H04L 29/06; H04L 65/1006; H04L 65/1009;
(Continued)

(56) References Cited

U.S. PATENT DOCUMENTS 8,027,456 B1 * 9/2011 Zhang et al. ................. 379/257
8,054,960 B1 * 11/2011 Gunasekara ............. 379/201.12
(Continued)

FOREIGN PATENT DOCUMENTS

CN 1816077 A 8/2006
CN 1905465 A 1/2007
(Continued)

OTHER PUBLICATIONS

Written Opinion of the International Search Authority issued in corresponding PCT Patent Application No. PCT/CN2009/072626, mailed Oct. 15, 2009.
(Continued)

*Primary Examiner* — Ahmad F Matar
*Assistant Examiner* — Kharye Pope
(74) *Attorney, Agent, or Firm* — Brinks Gilson & Lione

(57) ABSTRACT

A method, system, and relevant apparatuses for selecting a Multimedia Ring Back Tone (MRBT) are disclosed. The method for selecting an MRBT includes: receiving a call request sent by a calling party, where the call request carries an MRBT type required by the calling party; sending the MRBT type required by the calling party to the MRBT server; obtaining MRBT information sent by an MRBT server, according to the MRBT type required by the calling party; and sending the MRBT information to the calling party. With the present invention, the calling party sends the required MRBT type, and the MRBT server provides the corresponding MRBT information for the calling party. Therefore, the calling party has an opportunity of selecting the MRBT type required by the calling party, and thus user experience is improved.

19 Claims, 6 Drawing Sheets

(51) Int. Cl.
  *H04M 5/00* (2006.01)
  *H04M 1/56* (2006.01)
  *H04M 7/12* (2006.01)
  *H04W 4/20* (2009.01)

(52) U.S. Cl.
  CPC ...... *H04M 3/4211* (2013.01); *H04M 3/42161* (2013.01); *H04M 7/1235* (2013.01); *H04M 2203/2011* (2013.01); *H04M 2207/18* (2013.01); *H04W 4/20* (2013.01)

(58) Field of Classification Search
  CPC ....... H04L 2012/563; H04L 2012/6475; H04L 2012/6486; H04M 3/42059; H04M 2207/12; H04M 15/56; H04M 2215/202; H04M 3/42017; H04M 3/421
  USPC ...... 379/207, 211.02, 212.01, 88.13, 142.01, 379/207.16, 257, 220, 373, 374; 455/352, 455/414.1, 145, 457, 458, 419; 370/352, 370/353, 354, 355, 356, 357
  See application file for complete search history.

(56) References Cited

U.S. PATENT DOCUMENTS

| | | | |
|---|---|---|---|
| 2004/0120494 A1* | 6/2004 | Jiang et al. | 379/210.01 |
| 2005/0027716 A1* | 2/2005 | Apfel | 707/100 |
| 2006/0023862 A1* | 2/2006 | Sutcliffe | 379/257 |
| 2006/0147010 A1* | 7/2006 | Batni et al. | 379/202.01 |
| 2006/0177044 A1* | 8/2006 | O'Neil et al. | 379/373.02 |
| 2006/0210041 A1* | 9/2006 | Citron et al. | 379/201.07 |
| 2006/0291638 A1* | 12/2006 | Radziewicz et al. | 379/211.01 |
| 2007/0116251 A1* | 5/2007 | Seo | 379/372 |
| 2007/0116253 A1* | 5/2007 | Batni et al. | 379/399.01 |
| 2007/0123311 A1* | 5/2007 | Kim et al. | 455/567 |
| 2007/0127642 A1* | 6/2007 | Bae et al. | 379/88.13 |
| 2007/0165814 A1* | 7/2007 | Wang et al. | 379/201.01 |
| 2007/0201484 A1* | 8/2007 | Kenrick et al. | 370/395.5 |
| 2007/0211872 A1 | 9/2007 | Cai et al. | |
| 2007/0249326 A1 | 10/2007 | Nelson | |
| 2007/0286372 A1* | 12/2007 | DeMent et al. | 379/142.01 |
| 2007/0294425 A1* | 12/2007 | Sobti et al. | 709/231 |
| 2008/0037740 A1* | 2/2008 | Yoakum et al. | 379/142.01 |
| 2008/0192108 A1* | 8/2008 | Pelous et al. | 348/14.01 |
| 2008/0192900 A1* | 8/2008 | Liu | 379/87 |
| 2009/0003550 A1* | 1/2009 | Mani et al. | 379/88.19 |
| 2010/0014647 A1* | 1/2010 | Subramaniam | 379/87 |

FOREIGN PATENT DOCUMENTS

| | | |
|---|---|---|
| CN | 101009575 A | 8/2007 |
| EP | 1 686 781 A1 | 8/2006 |
| EP | 1 890 471 A1 | 2/2008 |

OTHER PUBLICATIONS

Office Action issued in corresponding Chinese Patent Application No. 200810132469.5, mailed May 25, 2011.
Office Action issued in corresponding Chinese Patent Application No. 200810132469.5, mailed Nov. 23, 2011.
International Search Report issued in corresponding PCT Application No. PCT/CN2009/072626; mailed Oct. 15, 2009.
Supplementary European Search Report issued in corresponding European Patent Application No. 09 79 3827; mailed Jul. 2, 2012.
Batni, Ramachandra et al. "Evolution of MiRingBack Service to Multimedia MiRingBack Service in IMS Framework." Bell Labs Technical Journal. Jan. 1, 2006.

* cited by examiner

METHOD, SYSTEM AND RELEVANT APPARATUSES FOR SELECTING MULTIMEDIA RING BACK TONE

CROSS-REFERENCE TO RELATED APPLICATIONS

This application is a continuation of International Application No. PCT/CN2009/072626, filed on Jul. 3, 2009, which claims priority to Chinese Patent Application No. 200810132469.5, filed on Jul. 11, 2008, both of which are hereby incorporated by reference in their entireties.

FIELD OF THE INVENTION

The present invention relates to communications technologies, and in particular, to a method, system, and relevant apparatuses for selecting a Multimedia Ring Back Tone (MRBT).

BACKGROUND OF THE INVENTION

The Ring Back Tone (RBT) service is a personalized mobile service that emerges in recent years. By using the RBT service, the calling party hears colorful music or sound effects instead of the monotone beeps after originating a call to the called party. The RBT service appeals to users, and caters for the personalized requirements of the users.

The MRBT service is an enhancement of the ordinary RBT service. That is, when a 3G mobile user originates a video call, the calling user views a multimedia video and hears a multimedia video tone before talking. The MRBT service provides more diverse tone content, for example, music or voice, texts, pictures, video clips or any combination of them. Compared with the traditional RBT service, the MRBT service is more appealing to users and better caters for the personalized requirements of the users.

FIG. 1 shows a widely applicable MRBT networking structure. The network includes: User Equipment (UE) 107 such as a mobile phone; a NodeB 101; a Radio Network Controller (RNC) 102, a Mobile Switching Center (MSC) server or Visitor Location Register (VLR) 103; a Media Gateway (MGW) 104; a Home Location Register (HLR) 105; and an MRBT server 106, also known as a Customized Alerting Tone (CAT) platform, or an MRBT platform.

In the prior art, after the phone of the called party rings, the MRBT server plays an MRBT to the calling party, where the MRBT is customized by the calling party or called party.

In the process of implementing the present invention, the inventor finds at least these problems in the prior art: When the MRBT server plays an MRBT customized by the calling party or called party to the calling party, the MRBT server provides no opportunity for the calling party to select an MRBT type required by the calling party, thus deteriorating user experience.

SUMMARY OF THE INVENTION

Embodiments of the present invention provide a method, system and relevant apparatuses for selecting an MRBT to improve user experience.

A method for selecting an MRBT includes:
sending a call request that carries an MRBT type required by a calling party; and
obtaining MRBT information sent by an MRBT server, according to the MRBT type required by the calling party.

The foregoing technical solution brings these benefits: The calling party sends the required MRBT type, and the MRBT server provides the corresponding MRBT information. Therefore, the calling party has an opportunity of selecting the MRBT type required by the calling party, and thus the user experience is improved.

DETAILED DESCRIPTION OF THE EMBODIMENTS

Figure 1:
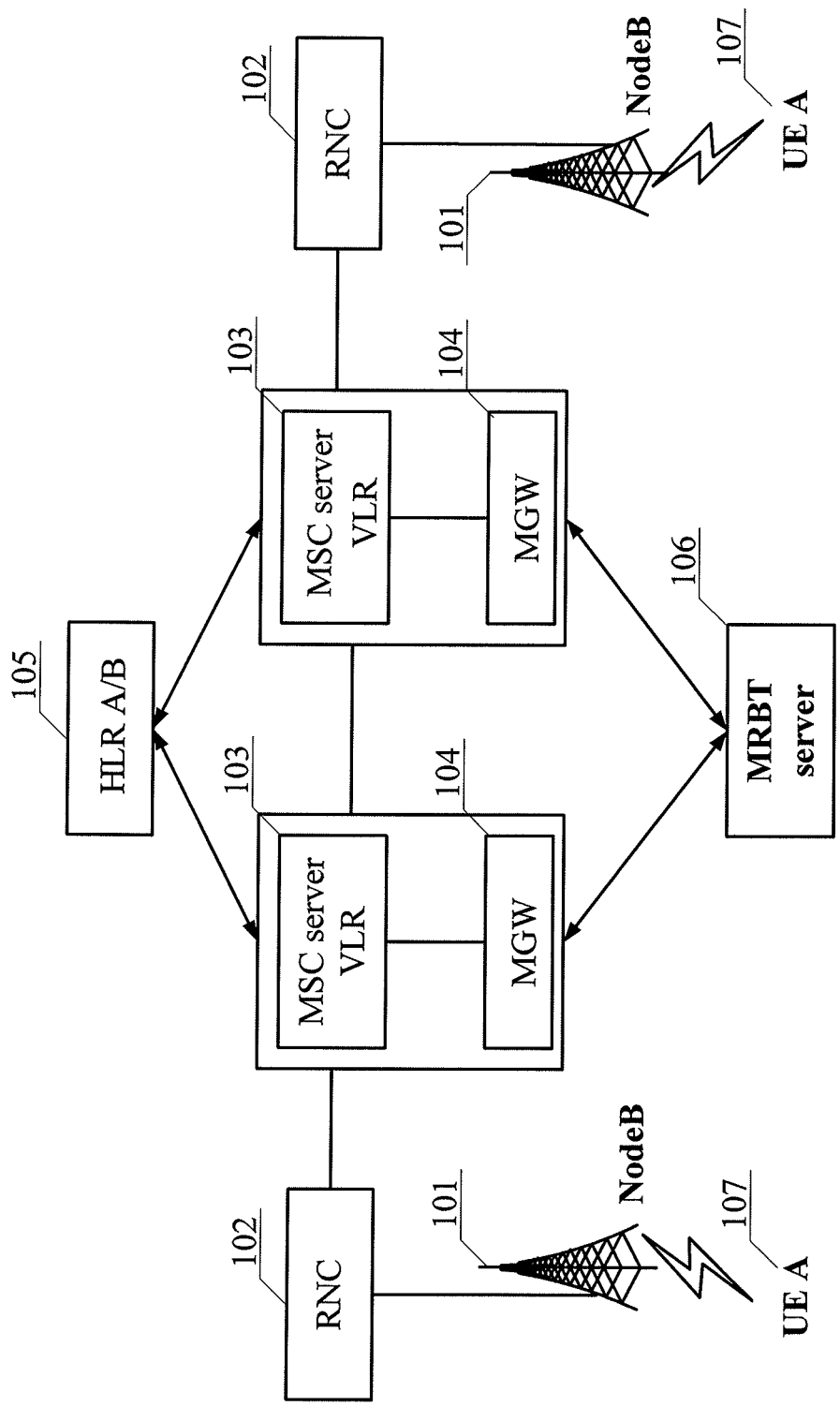
FIG. 1 is an MRBT networking diagram in the prior art.
Figure 2:
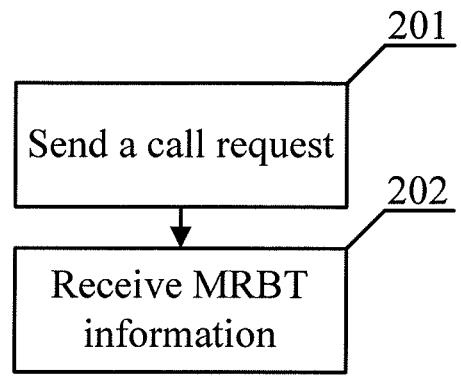
FIG. 2 is a flowchart of a first method embodiment of the present invention.

The embodiments of the present invention provide a method, system and relevant apparatuses for selecting an MRBT to improve the user experience.
First Embodiment
As shown in FIG. 2, a method for selecting an MRBT in this embodiment includes the following steps:
Step 201: Initiate a call request that carries the MRBT type required by a calling party.
The MRBT type required by the calling party may be carried in information relating to a protocol. The protocol may be a Q.931 signaling protocol, a Session Initiation Protocol (SIP), or an H.245 protocol. The type of the protocol shall not be construed as a limitation to the present invention.
If the MRBT type required by the calling party is carried in Q.931 information relating to signaling protocol information, the MRBT type may be carried in a user-to-user information field of a SETUP message and a CONNECT message, or carried in a user-to-user information field of an Initial Address Message (IAM). The message or field that carries the MRBT type required by the calling party shall not be construed as a limitation to the present invention.
Step 202: Obtain MRBT information, where the information is sent by an MRBT server according to the MRBT type required by the calling party.
The selected MRBT information includes: at least one of audio, video, text, picture, name card (vCard) of the called party, or Uniform Resource Locator (URL) of the Web page of the MRBT; or may be other types of MRBT information. The content and type of the MRBT information shall not be construed as limitations to the present invention.

If the MRBT information is at least one of or any combination of an MRBT, vCard information, and URL of the Web page of the MRBT, where the MRBT includes at least one of or any combination of audio, video, text, or picture, the MRBT information may be transmitted through a media channel; if the MRBT information is at least one of vCard information and URL of the MRBT, the MRBT information may be transmitted through the control-plane signaling. The transmission mode of the MRBT information shall not be construed as a limitation to the present invention.

The MRBT information may include the URL of the MRBT. In this case, after the MRBT information is obtained, the calling party may obtain the MRBT information from the Web server through HTTP according to the URL. The mode of obtaining the MRBT according to the MRBT address shall not be construed as a limitation to the present invention.

When the called party vCard stored by the calling party is invalid, the call request may indicate the requirement for the called party vCard; after receiving the called party vCard, the calling party may update the locally stored called party vCard according to the received called party vCard. In this way, it is not necessary to send the request for the called party information on every occasion of making a call, and, preferably but not mandatorily, the calling party updates the vCard information stored by the calling party after receiving the called party vCard.

The step of sending the MRBT information according to the MRBT type required by the calling party may be: The MRBT server obtains an intersection between the MRBT types required by the calling party and the MRBT types customized by the called party; if the intersection is not empty, the MRBT server sends MRBT information according to the intersection of the MRBT types; if the intersection is empty, the MRBT server sends the default MRBT information. The default MRBT information may be the default information in the system, or the MRBT information customized by the calling party or called party.

If the obtained intersection is not empty and includes no called party information, the MRBT server may instruct the called party to send the called party information to the calling party.

If the MRBT type required by the calling party and carried in the call request is empty, the calling party may customize the MRBT type required by the calling party by default in the MRBT server through a hypertext Web page; and the MRBT server sends the MRBT information according to the default MRBT type customized by the calling party.

In this embodiment, the calling party sends the required MRBT type, and the MRBT server provides the corresponding MRBT information for the calling party. Therefore, the calling party has an opportunity of selecting the MRBT type as required, and thus the user experience is improved.

Second Embodiment

Figure 3:
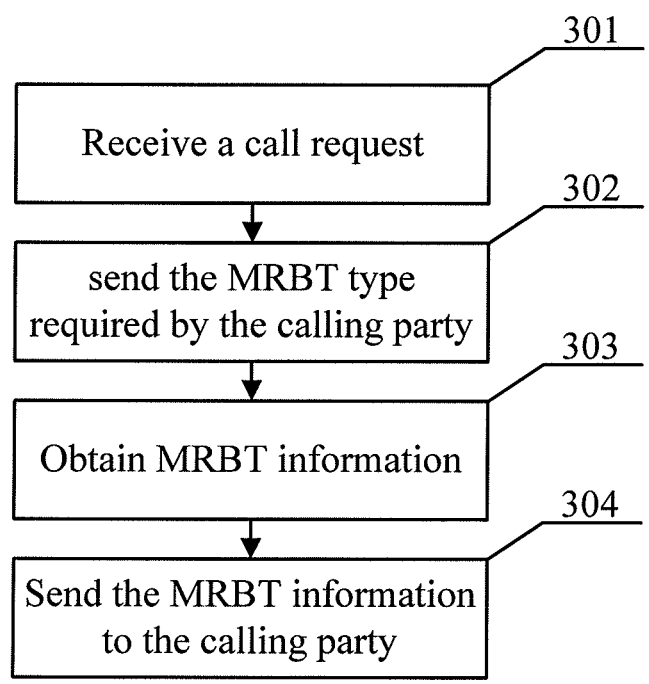
FIG. 3 is a flowchart of a second method embodiment of the present invention.

As shown in FIG. 3, the method for selecting an MRBT type may include the following steps:

Step 301: Receive a call request from the calling party. The call request carries the MRBT type required by the calling party, and the MRBT type may be audio or video.

Step 302: Send the MRBT type required by the calling party to the MRBT server.

Step 303: Obtain the MRBT information sent by the MRBT server according to the MRBT type required by the calling party, where the MRBT information may be an MRBT or an MRBT address.

Step 304: Send the MRBT information to the calling party.

In this embodiment, the calling party sends the required MRBT type, and the MRBT server provides the corresponding MRBT information for the calling party. Therefore, the calling party has an opportunity of selecting the MRBT type as required, and thus the user experience is improved.

Third Embodiment

On the basis of the second embodiment, the third embodiment provides a method for transmitting the called party information through MRBT information:

Step 301: The call request may further carry the called party information type required by the calling party; the called party information type may be the called-user information (such as vCard), or other information type required by the calling party. The type of the called party information shall not be construed as a limitation to the present invention. In this case, additional operations include:

step 302 further comprises: sending the called party information type required by the calling party to the MRBT server;

step 303 further comprises: obtaining the called-user information or called-user information address; and step 304 further comprises: sending the called party information to the calling party. The called party information may be called-user information or a called-user information address.

If the called-user information or the called-user information address is unavailable, step 303 in the second embodiment may further comprise: instructing the called party to send the called party information to the calling party.

This embodiment provides a method for obtaining the called party information on the basis of the second embodiment. The called party information may be obtained automatically in real time. The accurate called-user information can still be obtained after the called-user information is updated. The called-user information may be transmitted along with the MRBT information through the MRBT channel, thus improving the utilization of channels.

Fourth Embodiment

If the called-user information is stored in the calling UE, in the third embodiment, it is not necessary to send the called party information required by the calling party on every occasion of making a call. Step 301 in the third embodiment may be:

Receive the call request that carries the called party information type required by the calling party, when the called party information stored by the calling party is invalid.

The called party information is determined that it is invalid if the called party information is not updated within a preset period or if the called party information stored by the calling party is garble. The mode of determining the called party information as invalid shall not be construed as a limitation to the present invention.

By using the method provided in this embodiment, it is not necessary to send the called party information type required by the calling party on every occasion of making a call, and the MRBT server does not need to return the corresponding request on every occasion of making a call, thus relieving the network pressure.

Fifth Embodiment

When the MRBT type required by the calling party is empty, the implementation is as follows:

Step 303 in the second embodiment may be changed to: obtain the default MRBT type customized by the calling party, and send MRBT information according to the default MRBT type customized by the calling party.

The customization may be performed through a Web page or a PORTAL. The customization mode shall not be construed as a limitation to the present invention.

The fifth embodiment provides a processing method in the case that the MRBT type required and sent by the calling party is empty, and enhances the universal applicability of the present invention.

Sixth Embodiment

This embodiment provides a policy for selecting the MRBT type. The policy may be:

obtain an intersection between the MRBT types required by the calling party and the MRBT types customized by the called party; and send MRBT information according to the intersection of the MRBT types.

When the intersection of the MRBT types is empty, the default MRBT information may be played, or the MRBT information customized by the called party or calling party may be played.

The sixth embodiment provides the policy for selecting the MRBT based on an intersection between the MRBT types required by the calling party and the MRBT types customized by the called party, thus showing regard to the intention of the calling party and the called party and improving the user experience.

Seventh Embodiment

Figure 4:
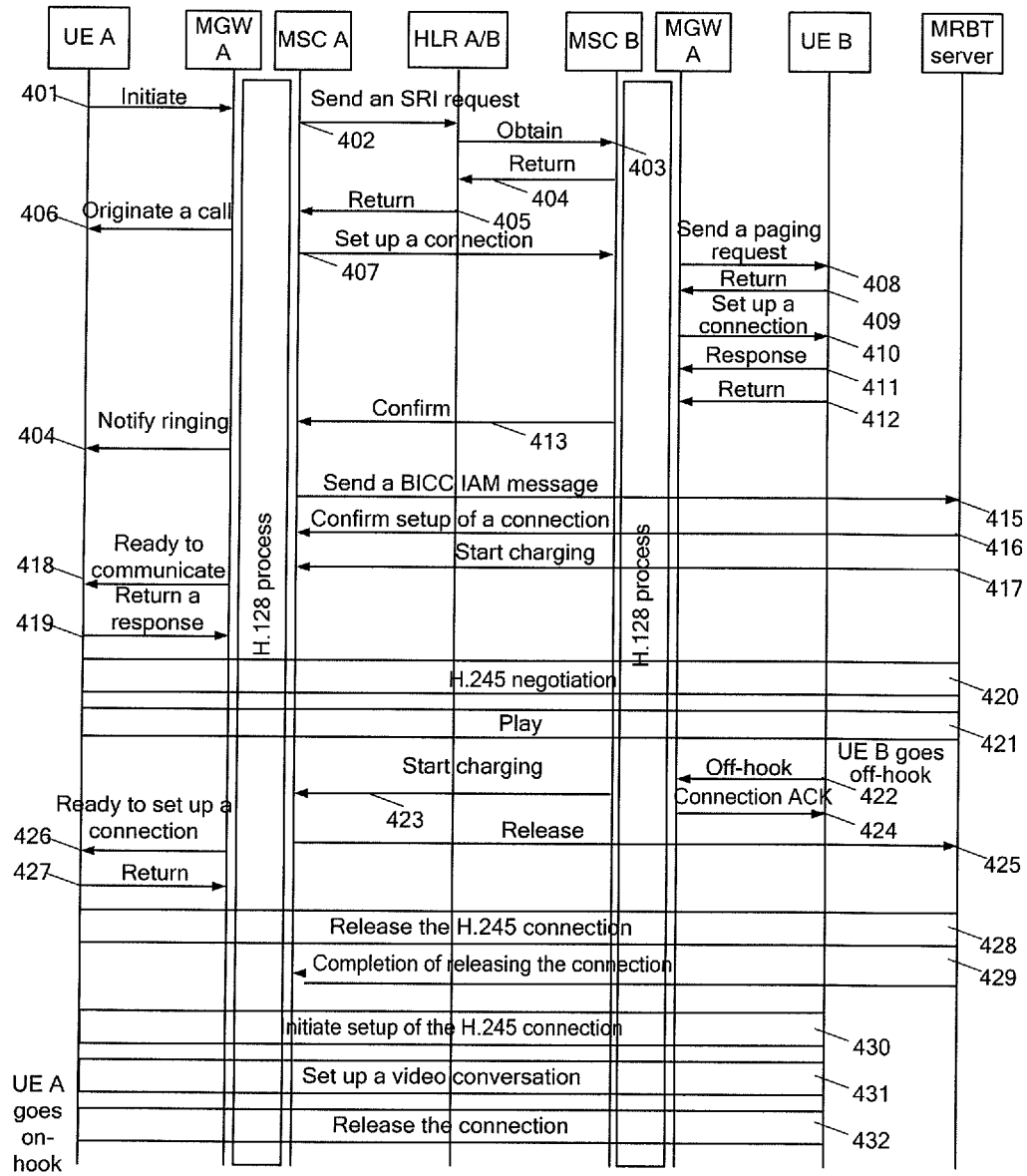
FIG. 4 is a flowchart of a seventh method embodiment of the present invention.

This embodiment describes the conception of the present invention by using an MRBT implementation mode in the prior art as background, as shown in FIG. 4. The background for implementing the MRBT shall not be construed as a limitation to the present invention. In this embodiment, it is assumed that the MRBT server plays the MRBT required by the calling party.

Step 401: Calling UE A (shown in FIG. 4) sets the MRBT type required by the calling party. The MRBT type required by the calling party may be: vCard only, or vCard and music, or vCard and video, or music only, or video only. When UE A originates a call to called UE B (shown in FIG. 4), the MRBT type set by UE A may be carried in the "user-to-user Information" field to MSC server A. This field is an extended field and may carry 131 bytes of data, which is enough for storing all kinds of MRBT type information. Nevertheless, the set MRBT type information may be carried in other modes. The mode of carrying the MRBT type information shall not be construed as a limitation to the present invention.

Step 402: MSC server A sends an SRI request to HLR B to obtain the routing information of UE B.

Step 403: HLR B retrieves a Mobile Station Roaming Number (MSRN) from the VLR in MSC server B to which UE B is attached.

Step 404: The VLR in MSC server B returns a PRN_ACK message to HLR B, where the message may carry the MSRN of UE B.

Step 405: HLR B returns an SRI_ACK message to MSC server A. The message may carry routing information of UE B, an MSRN, a flag of the MRBT service customized by UE B, and a flag of the vCard display service customized by UE B, and so on.

Step 406: After obtaining the MSRN of the called party, MSC server A may initiate a Call_Proceeding to UE A to indicate that MSC server A is making a call.

Step 407: MSC server A may send a BICC IAM message to MSC server B to set up a circuit connection to MSC server B.

Step 408: MSC server B may send a paging request message "PAGING" to UE B.

Step 409: UE B returns a paging response message "PAGING_RSP".

Step 410: MSC server A sends a SETUP message to UE B to set up a call connection to called UE B.

Step 411: UE B returns a CALL CONFIRMED message in response to the SETUP message.

Step 412: UE B rings and returns an ALERTING message to MSC server B.

Step 413: MSC server B returns a BICC ACM message to MSC server A to confirm that the corresponding trunk circuit on the local exchange of the called party has been set up.

Step 414: MSC server A returns an ALERTING message to calling UE A, indicating that called UE B is ringing.

Step 415: MSC server A sends a BICC IAM message to the MRBT platform. The "user-to-user information" field of the IAM message may carry a flag of the MRBT service customized by called UE B, a flag of the vCard display service customized by UE B, and a flag of MRBT content required by UE A. Such flags may also be carried in other messages. The message that carries such flags shall not be construed as a limitation to the present invention.

Step 416: The MRBT platform returns a BICC ACM message to MSC server A to confirm that the circuit from MSC server A to the MRBT platform has been set up.

Step 417: The MRBT platform returns a BICC ANM message to MSC server A to instruct MSC server A to start charging after calling UE A is connected to the MRBT platform.

In step 415, the message may be sent upon receiving the message mentioned in step 405. Therefore, step 415 to step 417 can be performed between step 405 and step 407?.

Step 418: MSC server A sends a CONNECT message to calling UE A, indicating that UE A can communicate with the MRBT platform.

Step 419: UE A returns a CONNECT_ACK message to MSC server A.

Step 420: UE A and the MRBT platform perform H.245 negotiation.

Step 421: The MRBT platform may play the MRBT to UE A according to the MRBT type customized by UE B, the MRBT type required by UE A, and the policy preset in the platform. The policy may be: meet requirements of UE A as far as possible, or play the MRBT according to an intersection between the MRBT types required by the calling party and the MRBT types customized by the called party. The called party information required by UE A may be transmitted through a 3G-324M protocol suite or through signaling on the control plane. The vCard of UE A may be sent to UE B by means of a Customized Ring Tone (CRT). In this way, when UE A originates a call to UE B, the calling party and the called party can see the vCard information of the opposite party. By the end of step 421, the technical objectives of this embodiment have been fulfilled.

Step 422: Called UE B hooks off, and sends a CONNECT message as a response.

Step 423: MSC server B returns a BICC ANM message to MSC server A, instructing MSC server A to start charging after UE A is connected to UE B.

Step 424: MSC server B returns a CONNECT_ACK message to UE B.

Step 425: MSC server A sends a BICC REL message to the MRBT platform, instructing the MRBT platform to release the circuit to calling UE A.

Step 426: MSC server A sends a CONNECT message to UE A again to set up a connection between UE A and UE B.

Step 427: UE A returns an ACK message in response to the CONNECT message.

Step 428: The MRBT platform actively releases the H.245 connection between the MRBT platform and UE A.

Step 429: The MRBT platform returns a BICC REL message to MSC server A, indicating completion of releasing the connection.

Step 430: Calling UE A initiates setup of the H.245 connection to called UE B.

Step 431: UE A and UE B perform a normal Circuit Switched (CS) video conversation.

Step 432: UE A hooks on, and releases the H.245 connection between UE A and UE B at the same time. The video conversation is ended.

In the seventh embodiment, the calling party sends the required MRBT type; and the MRBT server provides the corresponding MRBT information for the calling party. In this way, the calling party has an opportunity of selecting the MRBT type as required, and thus the user experience is improved. In addition, this embodiment provides a method for obtaining the called party information automatically in real time. The accurate called-user information can still be obtained after the called-user information is updated. The called-user information may be transmitted along with the MRBT information through an MRBT channel, thus improving the utilization of channels.

Eighth Embodiment

This embodiment describes the conception of the present invention by using an MRBT implementation mode in the prior art as background. In this embodiment, it is assumed that the MRBT server plays the address of the MRBT required by the calling party. The address of the MRBT may be expressed by a URL or expressed in other modes. The expression mode shall not be construed as a limitation to the present invention. This embodiment is basically the same as the seventh embodiment, but differs in the following aspects:

Step 416 may be: The MRBT platform may send the vCard of UE B and the URL of the MRBT to MSC server A according to the MRBT type customized by UE B, the MRBT type required by calling UE A, and the preset policy. The URL may be carried in a user-to-user information field of the BICC ACM message, or carried in other messages. The message for carrying that field shall not be construed as a limitation to the present invention.

In contrast to the seventh embodiment, the called party information in the eighth embodiment does not need to be stored in the MRBT server, thus saving the storage resources of the MRBT server, supporting more diverse called party information, and improving the user experience.

Ninth Embodiment

This embodiment describes the conception of the present invention by using an MRBT implementation mode in the prior art as background. In this embodiment, it is assumed that the user information is already stored in calling UE A. This embodiment is basically the same as the seventh embodiment, but differs in the following aspects:

Before step 401, a judgment is made about whether the called party information stored in calling UE A is valid. If the called party information is invalid, the called party information type required by the calling party is sent in step 401. The called party information is determined that it is valid if the called party information is updated within a preset period or if the called party information is stored by the calling party. The mode of determining the called party information as invalid shall not be construed as a limitation to the present invention.

After step 422, the called party information stored in calling UE A may be updated to synchronize information and keep accuracy of the called party information.

In contrast to the seventh embodiment and the eighth embodiment, the called party information type required by the calling party in the ninth embodiment does not need to be sent on every occasion of making a call, the traffic of sent messages is reduced, and the network resources are saved.

Tenth Embodiment

Figure 5:
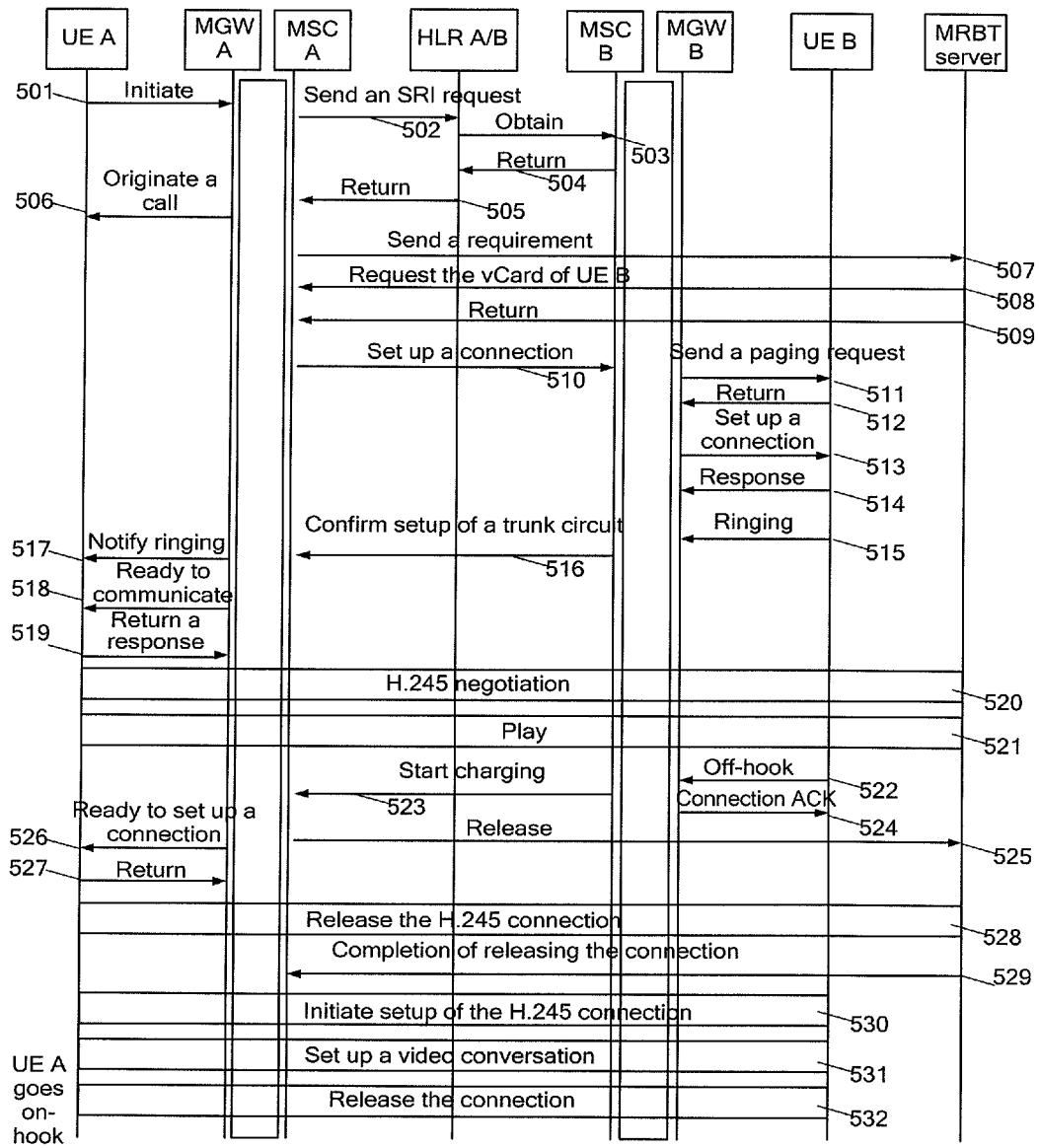
FIG. 5 is a flowchart of a tenth method embodiment of the present invention.

This embodiment describes the conception of the present invention by using an MRBT implementation mode in the prior art as background. In this embodiment, it is assumed that the MRBT server instructs the called user to send the called-user information, as shown in FIG. 5.

Step 501: When calling UE A (shown in FIG. 4) originates a call to called UE B (shown in FIG. 4), the desired MRBT type set by UE A may be carried in the "User-to-user Information" extended field of the SETUP message to MSC server A.

Step 502: MSC server A sends an SRI request to HLR B to obtain the routing information of UE B.

Step 503: HLR B retrieves an MSRN from the VLR in MSC server B to which UE B is attached.

Step 504: The VLR in MSC server B returns a PRN_ACK message to HLR B, where the message may carry the MSRN of UE B.

Step 505: HLR B returns an SRI_ACK message to MSC server A. The message may carry routing information of UE B, an MSRN, a flag of the MRBT service customized by UE B, and a flag of the vCard display service customized by UE B.

Step 506: After obtaining the MSRN of the called party, MSC server A may initiate a Call_Proceeding to UE A to indicate that MSC server A is making a call.

Step 507: MSC server A sends a BICC IAM message to the MRBT platform. The "user-to-user information" field of the IAM message may carry the MRBT type customized by UE B and the MRBT type required by UE A.

Step 508: If the MRBT platform discovers that the vCard of UE B which is required by UE A is not stored in the platform, the "user-to-user information" field of the BICC ACM message sent to MSC server A may carry a request for the vCard of UE B.

Step 509: The MRBT platform returns a BICC ANM message to MSC server A to instruct MSC server A to start charging after calling UE A is connected to the MRBT platform.

Step 510: MSC server A sends a BICC IAM message to MSC server B to set up a circuit connection to MSC server B. The "user-to-user information" field of the IAM message may carry a request for the vCard of UE B.

Step 511: MSC server B sends a paging request message "PAGING" to UE B.

Step 512: UE B returns a paging response message "PAGING_RSP".

Step 513: MSC server B sends a SETUP message to UE B to set up a call connection to called UE B. The "user-to-user information" field of the SETUP message may carry a request for the vCard of UE B.

Step 514: UE B returns a CALL CONFIRMED message in response to the SETUP message.

Step 515: UE B rings and returns an ALERTING message to MSC server B. The "user-to-user information" field of the ALERTING message may carry the vCard of UE B.

Step 516: MSC server B returns a BICC ACM message to MSC server A to confirm that the corresponding trunk circuit on the local exchange of the called party has been set up. The "user-to-user information" field of the ACM message may carry the vCard of UE B.

Step 517: MSC server A returns an ALERTING message to calling UE A, indicating that the called UE B is ringing. The "user-to-user information" field of the ALERTING message may carry the vCard of UE B. In this case, UE A sees the vCard of UE B.

Step 518: MSC server A sends a CONNECT message to calling UE A, indicating that UE A can communicate with the MRBT platform.

Step 519: UE A returns a CONNECT_ACK message to MSC server A.

Step 520: UE A and the MRBT platform perform H.245 negotiation.

Step 521: The MRBT platform may play the MRBT to UE A according to the MRBT type customized by UE B, the MRBT type required by UE A, and the policy preset in the platform. The policy may be: meet requirements of UE A as far as possible, or play the MRBT according to an intersection between the MRBT types required by the calling party and the MRBT types customized by the called party. By the end of step 521, the technical objectives of this embodiment have been fulfilled.

Step 522: Called UE B hooks off, and sends a CONNECT message as a response.

Step 523: MSC server B returns a BICC ANM message to MSC server A, instructing MSC server A to start charging after UE A is connected to UE B.

Step 524: MSC server B returns a CONNECT_ACK message to UE B.

Step 525: MSC server A sends a BICC REL message to the MRBT platform, instructing the MRBT platform to release the circuit to calling UE A.

Step 526: MSC server A sends a CONNECT message to UE A again to set up a connection between UE A and UE B.

Step 527: UE A returns an ACK message in response to the CONNECT message.

Step 528: The MRBT platform actively releases the H.245 connection between the MRBT platform and UE A.

Step 529: The MRBT platform returns a BICC REL message to MSC server A, indicating completion of releasing the connection.

Step 530: Calling UE A initiates setup of the H.245 connection to called UE B.

Step 531: UE A and UE B perform a normal CS video conversation.

Step 532: UE A hooks on, and releases the H.245 connection between UE A and UE B at the same time. The video conversation is ended.

In the tenth embodiment of the present invention, when the called party information required by the calling party on the MRBT server is empty, the called party may send the called party information to the calling party, and the vCard may be transmitted in end-to-end mode. The requirements of the calling user are fulfilled without additional messages, and the network resources are saved.

Eleventh Embodiment

Figure 6:
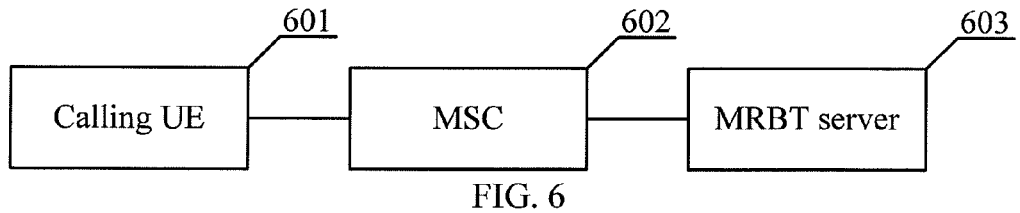
FIG. 6 shows a system structure in an eleventh embodiment of the present invention.

As shown in FIG. 6, a system for selecting an MRBT in this embodiment includes:
a calling UE 601, connected to an MSC 602, and configured to send a call request that carries an MRBT type required by the calling party;
an MRBT server 603, connected to the MSC 602, and configured to send MRBT information according to the MRBT type required by the calling party; and
the MSC 602, connected to the calling UE 601 and the MRBT server 603, and configured to: send the call request to the MRBT server 603, obtain the MRBT information sent by the MRBT server 603 according to the MRBT type required by the calling party, and send the MRBT information to the calling UE 601.

The MRBT server 603 may be further configured to obtain an intersection between the MRBT types required by the calling party and the MRBT types customized by the called party, and send the MRBT information according to the intersection.

Twelfth Embodiment

Figure 7:
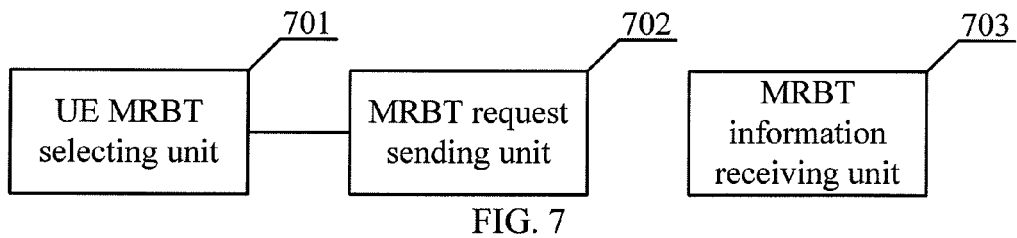
FIG. 7 shows a UE structure in a twelfth embodiment of the present invention.

As shown in FIG. 7, a UE provided in this embodiment includes:
a UE MRBT selecting unit 701, configured to select an MRBT type required by the UE;
an MRBT type request sending unit 702, connected to the UE MRBT selecting unit 701, and configured to send the MRBT type required by the UE; and
an MRBT information receiving unit 703, configured to receive MRBT information.

Figure 8:
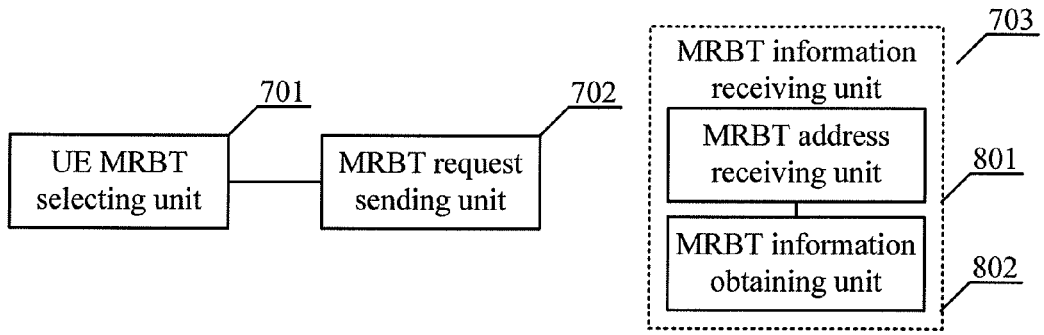
FIG. 8 shows another UE structure in the twelfth embodiment of the present invention.

As shown in FIG. 8, the MRBT information receiving unit 703 in the UE provided in the twelfth embodiment may include:
an MRBT address receiving unit 801, configured to receive the address of the MRBT information; and
an MRBT information obtaining unit 802, connected to the MRBT address receiving unit 801, and configured to obtain the MRBT information according to the address of the MRBT information.

Thirteenth Embodiment

Figure 9:
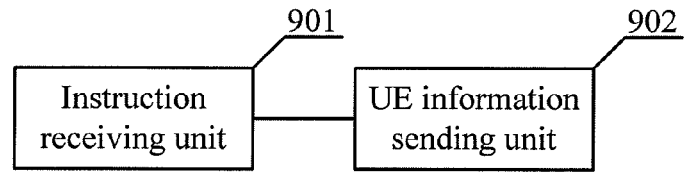
FIG. 9 shows another UE structure in a thirteenth embodiment of the present invention.

As shown in FIG. 9, another UE provided in this embodiment includes:
an instruction receiving unit 901, configured to receive an instruction for sending UE information; and
a UE information sending unit 902, connected to the instruction receiving unit 901, and configured to send the UE information according to the instruction for sending the UE information.

Fourteenth Embodiment

Figure 10:
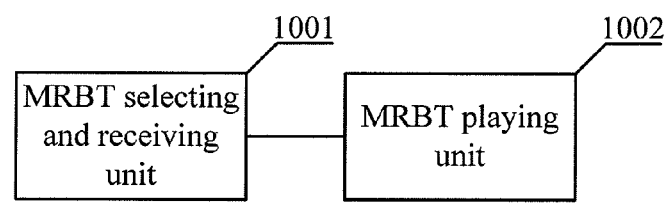
FIG. 10 shows a structure of an MRBT server in a fourteenth embodiment of the present invention.

As shown in FIG. 10, an MRBT server provided in this embodiment includes:
an MRBT selecting and receiving unit 1001, configured to receive an MRBT type required by the calling party; and
an MRBT playing unit 1002, connected to the MRBT selecting and receiving unit 1001, and configured to send MRBT information according to the MRBT type required by the calling party.

Fifteenth Embodiment

Figure 11:
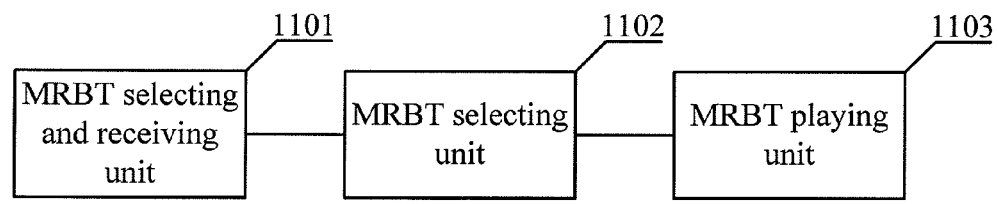
FIG. 11 shows a structure of another MRBT server in a fifteenth embodiment of the present invention.

As shown in FIG. 11, another MRBT server provided in this embodiment includes:
an MRBT selecting and receiving unit 1101, configured to receive an MRBT type required by the calling party;
an MRBT selecting unit 1102, connected to the MRBT selecting and receiving unit 1101, and configured to obtain an intersection between the MRBT types required by the calling party and the MRBT types customized by the called party; and
an MRBT playing unit 1103, connected to the MRBT selecting unit 1102, and configured to send MRBT information according to the intersection.

Sixteenth Embodiment

Figure 12:
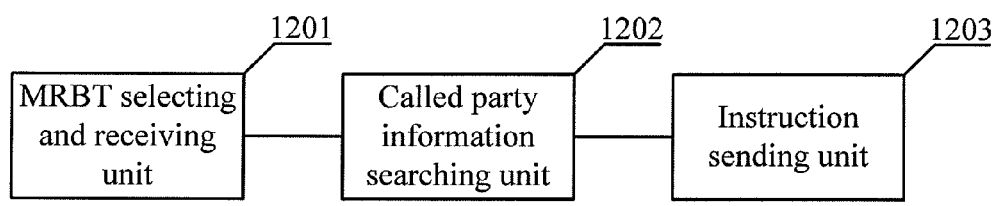
FIG. 12 shows a structure of another MRBT server in a sixteenth embodiment of the present invention.

As shown in FIG. 12, another MRBT server provided in this embodiment includes:
an MRBT selecting and receiving unit 1201, configured to receive an MRBT type required by the calling party;

a called party information searching unit 1202, connected to the MRBT selecting and receiving unit 1201, and configured to search for the called-user information according to the MRBT type required by the calling party; and an instruction sending unit 1203, connected to the called party information searching unit 1202, and configured to send an instruction if the called-user information is empty, where the instruction instructs the called party to send the called party information.

Through the system and apparatuses described above, the calling party sends the required MRBT type, and the MRBT server provides the corresponding MRBT information for the calling party. Therefore, the calling party has an opportunity of selecting the MRBT type as required, and thus the user experience is improved.

Persons of ordinary skill in the art should understand that all or a part of the steps of the method in the embodiments of the present invention may be implemented by a program instructing relevant hardware. The program may be stored in a computer readable storage medium. The storage medium may be a Read Only Memory (ROM), magnetic disk, or Compact Disk-Read Only Memory (CD-ROM).

Described above are a method, a system, and relevant apparatuses under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall within the scope of protection defined by the following claims or their equivalents.

What is claimed is:

1. A method for selecting a particular Multimedia Ring Back Tone (MRBT) type when a call is being initiated, comprising:
   sending, by the calling party, a call request for initiating a call between the calling party and a called party, wherein the calling party makes a specific request for a particular MRBT type in the call request at the time the call is being initiated, wherein the particular MRBT type is carried in information relating to a protocol used by the call request; and the protocol is one of: a Q.931 signaling protocol or an H.245 protocol; and
   receiving MRBT information sent by an MRBT server according to the particular MRBT type requested by the calling party.

2. The method according to claim 1, wherein:
   if the particular MRBT type requested by the calling party is carried in information relating to the Q.931 signaling protocol, the particular MRBT type is carried in one of:
   a "user-to-user information" field in a SETUP message and a CONNECT message, or
   a "user-to-user information" field in an Initial Address Message (IAM).

3. The method according to claim 1, wherein the MRBT information comprising:
   at least one of audio, video, text, picture, vCard information, and Uniform Resource Locator (URL) of an MRBT.

4. The method according to claim 3, wherein the receiving of the MRBT information sent by the MRBT server, comprising one of:
   receiving, through a media channel, at least one of the audio, video, text, picture, vCard information, and URL of the MRBT that are sent by the MRBT server according to the particular MRBT type requested by the calling party; or
   receiving, through control-plane signaling, at least one of vCard information and the URL of the MRBT that are sent by the MRBT server according to the particular MRBT type requested by the calling party.

5. The method according to claim 3, wherein if the MRBT information comprises the URL of the MRBT, after the receiving the requested MRBT information, the method comprising:
   obtaining the MRBT information from a Web server through a Hypertext Transfer Protocol (HTTP) according to the URL.

6. The method according to claim 3, wherein the call request further carries a requirement for a vCard of a called party when the vCard of the called party stored by the calling party is invalid.

7. The method according to claim 3, wherein after the receiving of the MRBT information, the method comprising:
   updating a vCard of a called party stored by the calling party.

8. The method according to claim 1, wherein the receiving of the MRBT information sent by the MRBT server comprising one of:
   receiving the MRBT information sent by the MRBT server according to an intersection between particular MRBT types required by the calling party and particular MRBT types customized by a called party, if the intersection is not empty; or
   receiving default MRBT information sent by the MRBT server, if the intersection between the particular MRBT types required by the calling party and the particular MRBT types customized by the called party is empty.

9. The method according to claim 8, wherein if the obtained intersection is not empty and comprises no called party information, the method further comprising: receiving called party information, wherein the information is sent by the called party according to an instruction from the MRBT server.

10. The method according to claim 1, wherein:
    before the sending of the call request, the method further comprising:
    customizing a default MRBT type requested by the calling party in the MRBT server through a hypertext Web page; and
    if the particular MRBT type requested by the calling party in the call request is empty, the receiving of the MRBT information sent by the MRBT server comprising:
    receiving the MRBT information sent by the MRBT server according to the default MRBT type customized by the calling party.

11. A method for selecting a particular Multimedia Ring Back Tone (MRBT) type when a call is being initiated, comprising:
    receiving a call request from a calling party when the calling party initiates a call, wherein the call request carries a request for a particular MRBT type requested by the calling party at the time the call is being initiated, wherein the particular MRBT type is carried in information relating to a protocol used by the call request; and the protocol is one of: a Q.931 signaling protocol or an H.245 protocol; and
    sending MRBT information to the calling party according to the particular MRBT type requested by the calling party.

12. The method according to claim 11, wherein the call request further carries called party information requested by the calling party, if the called party information stored by the calling party is invalid.

13. The method according to claim 12, further comprising:
sending MRBT information that carries called party vCard information to the calling party according to the received call request, wherein the received call request carries the called party information type requested by the calling party.

14. The method according to claim 11, wherein if the particular MRBT type requested by the calling party is empty, the method comprising:
obtaining a default MRBT type requested and customized by the calling party; and
sending MRBT information according to the default MRBT type requested and customized by the calling party.

15. User Equipment (UE), comprising:
a UE Multimedia Ring Back Tone (MRBT) selecting unit configured to select a particular MRBT type requested by the UE at the time a call is being initiated, wherein the particular MRBT type is carried in information relating to a protocol used by a call request that is communicated from a calling party when initiating a call; and the protocol is one of: a Q.931 signaling protocol or an H.245 protocol;
an MRBT type request sending unit, configured to send the particular MRBT type requested by the UE to a network; and
an MRBT information receiving unit, configured to receive MRBT information sent according to the particular MRBT type by the network.

16. The UE according to claim 15, wherein the MRBT information receiving unit comprises:
an MRBT address receiving unit, configured to receive an address of the MRBT information; and
an MRBT information obtaining unit, configured to obtain the MRBT information according to the address of the MRBT information.

17. A Multimedia Ring Back Tone (MRBT) server, comprising:
an MRBT selecting and receiving unit configured to receive a particular MRBT type required by a calling party, wherein the particular MRBT type is specified in a calling request that is communicated from the calling party at the time a call is being initiated, wherein the particular MRBT type is carried in information relating to a protocol used by the call request; and the protocol is one of: a Q.931 signaling protocol or an H.245 protocol; and
an MRBT playing unit, configured to send MRBT information according to the particular MRBT type requested by the calling party.

18. The MRBT server according to claim 17, further comprising:
an MRBT selecting unit, configured to obtain an intersection between MRBT types requested by the calling party and particular MRBT types customized by a called party; and
the MRBT playing unit, specifically configured to send the MRBT information according to the intersection.

19. The MRBT server according to claim 17, further comprising:
a called party information searching unit, configured to search for called user information according to the particular MRBT type requested by the calling party; and
an instruction sending unit, configured to send an instruction if the called user information is empty, wherein the instruction instructs a called party to send called party information.

* * * * *